United States Patent
Chen et al.

(10) Patent No.: US 7,052,733 B2
(45) Date of Patent: May 30, 2006

(54) METHOD FOR MAKING THIN FILM FILTER HAVING A NEGATIVE TEMPERATURE DRIFT COEFFICIENT

(75) Inventors: Ga Lane Chen, Fremont, CA (US); Charles Leu, Fremont, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 634 days.

(21) Appl. No.: 10/044,271

(22) Filed: Jan. 10, 2002

(65) Prior Publication Data

US 2003/0129417 A1   Jul. 10, 2003

(51) Int. Cl.
*B05D 5/06* (2006.01)
*B05D 3/12* (2006.01)

(52) U.S. Cl. ............... 427/162; 427/164; 427/165; 427/289; 427/299; 427/398.1

(58) Field of Classification Search ......... 204/192.11, 204/192.15, 192.26; 427/162, 164, 289, 427/299, 419.3
See application file for complete search history.

(56) References Cited

U.S. PATENT DOCUMENTS

| | | | |
|---|---|---|---|
| 4,741,962 A * | 5/1988 | Wada et al. | 428/428 |
| 4,793,908 A * | 12/1988 | Scott et al. | 204/192.26 |
| 6,798,553 B1 * | 9/2004 | Scobey et al. | 359/260 |
| 2003/0123167 A1 * | 7/2003 | Kolberg et al. | 359/885 |

* cited by examiner

*Primary Examiner*—Stephen Stein
(74) *Attorney, Agent, or Firm*—Wei Te Chung

(57) ABSTRACT

A method for making thin film filters having a negative temperature drift coefficient are the subject of the present invention. Such filters can achieve better optical control within an operational temperature range from −5° C. to 70° C. degrees. A first embodiment of the present invention includes: 1. providing a substrate wafer which has a coefficient of thermal expansion (CTE) greater than that of a selected film stack material; 2. polishing the substrate wafer; 3. depositing thin film layers made of the film stack material on the substrate wafer at a temperature substantially higher than room temperature; 4. cooling the substrate-film stack laminate to room temperature, thus forming a convex-shaped laminate; 5. cutting the cooled laminate into pieces. A second embodiment includes the steps of: 1. providing a laminate composed of a glass substrate and a film stack; 2. using at least one ion beam source to bombard the film stack of the laminate with high energy ions; 3. cutting the bombarded laminate into pieces.

3 Claims, 3 Drawing Sheets

1

METHOD FOR MAKING THIN FILM FILTER HAVING A NEGATIVE TEMPERATURE DRIFT COEFFICIENT

BACKGROUND OF THE INVENTION

1. Field of the Invention

The present invention relates to thin film filters and the method making the same, and particularly to thin film filters having a negative temperature drift coefficient which can achieve better control of the optical performance of a DWDM system when working within the operational temperature range. The related invention record was filed in PTO with disclosure document no. 495113 on Jun. 12, 2001.

2. Description of Related Art

In recent years, thin film filters have often been used in optical systems for signal processing or optical communications. The filters operate to select light of desired wavelengths, often within a narrow band. Thin film filters may be used in association with gradient refractive index (GRIN) lenses and optical fibers to form a dense wavelength division multiplexing (DWDM) device. Referring to FIG. 5, the operating principle of an eight-channel, filter type DWDM device is illustrated. Ideally, a light beam of a particular wavelength is considered one channel. In practice, one channel is defined by a very narrow range of wavelengths. The more channels a DWDM device has, the narrower the pass bandwidth of each channel.

To obtain narrower pass bandwidths, more layers of film are normally deposited on a glass substrate, creating a stack of films on the substrate. However, this procedure inevitably induces more internal stress in the film stack. The more tensile stress endured by a film stack, the looser the atomic structure of the films in the stack. Interfaces between film layers in the stack act as mirrors, which act to separate the wavelengths of a light beam. A looser atomic structure in a film stack lowers the reflectivity of these interfaces. Thus tensile stress in a film stack acts to broaden the pass bandwidth. Conversely, the more compressive stress endured by a film stack, the narrower the pass bandwidth of the filter is.

The coating process is designed to minimize pass bandwidth drift at room temperature (23° C.). The operational temperature range of a thin film filter is from 5° C. to 70° C. Within this temperature range, the stress in the filter varies substantially linearly with the temperature. FIG. 2 shows pass bandwidth of a filter at room temperature. Alcatel's 1915 LMI 10 mw WDM thin film filter has a positive temperature drift coefficient, 1 pm/° C. FIG. 3 shows how the pass bandwidth of Alcatel's 1915 LMI changes with a change in temperature. When the 1915 LMI's temperature increases from 23° C. to 70° C., a 47 pm pass bandwidth enlargement occurs, and when the temperature decreases from 23° C. to 5° C., a 28 pm pass bandwidth reduction occurs, as is illustrated in FIG. 3. Obviously, since temperature fluctuation and resulting pass bandwidth drift are inevitable, it is preferable if pass bandwidth is reduced more often than it is increased as the environmental temperature changes. Consequently, referring to FIG. 4, there is a demand for thin film filters having a negative temperature drift coefficient, in which pass bandwidth broadens when temperature decreases and narrows when temperature increases, as shown in FIG. 4. Note that in FIG. 4, the pass bandwidth increases less at the most extreme temperatures than for the Alcatel 1915 LMI case shown in FIG. 3.

Operational temperature fluctuation affects the stress present in a thin film filter, since film stacks and substrates of thin film filters are composed of different materials having different coefficients of thermal expansion (CTE). Thin film stacks are deposited on substrates under temperatures substantially higher than room temperature, and then are allowed to cool down to room temperature. If the CTE of a film stack is smaller than that of a substrate on which it is mounted, then the film stack will shrink less than the substrate does as they cool down. Therefore, a convex deformation occurs and a compressive stress is induced in the film stack (see FIG. 1*b*). This is the case of a stack-substrate combination having a negative temperature drift coefficient.

In nearly all prior art, DWDM thin film filters have positive temperature drift coefficients. This is the situation illustrated in FIG. 1*a*. Because the thin film stack is deposited under a temperature substantially higher than room temperature, when cooling down to room temperature, the film stack, which has a CTE greater than that of the substrate on which the film stack is mounted, shrinks more than the substrate does. Therefore, a concave deformation occurs. The film stack in this situation is under a tensile stress and pass bandwidth increases as temperature increases, which causes greater susceptibility to crosstalk as temperature increases. The tensile stress endured by the film stack is also a disadvantage during cutting operations, since it makes the affected film layers more brittle, increasing the probability of damage to the film stack during cutting. Furthermore, the adhesion between the film stack and the substrate may be overstressed, resulting in peeling of the film stack from the substrate.

SUMMARY OF THE PRESENT INVENTION

An object of the present invention is to provide thin film filters having a negative temperature drift coefficient and the method making the same, thus promoting a narrowing of pass bandwidth as temperature rises within its operational temperature range.

Another object of the present invention is to provide a method for making thin film filters having film stacks which are under a compressive stress during cutting of the thin film filters.

Two embodiments of the present inventive method for making thin film filters having a negative temperature drift coefficient are disclosed. The first embodiment comprises steps of: 1. providing a substrate wafer which has a coefficient of thermal expansion (CTE) greater than that of a selected film stack material; 2. polishing the substrate wafer; 3. depositing thin film layers made of the film stack material on the substrate wafer at a temperature substantially higher than room temperature; 4. cooling the substrate-film stack laminate to room temperature, thus forming a convex-shaped laminate; 5. cutting the cooled laminate into pieces at room temperature. The second embodiment comprises the steps of: 1. providing a laminate composed of a glass substrate and a film stack; 2. using at least one ion beam source to bombard the film stack of the laminate with high energy ions; 3. cutting the bombarded laminate into pieces.

Other objects, advantages and novel features of the invention will become more apparent from the following detailed description when taken in conjunction with the accompanying drawings, in which:

DETAILED DESCRIPTION OF PREFERRED EMBODIMENTS OF THE PRESENT INVENTION

The present invention provides two embodiments of a method for making thin film filters having a negative temperature drift coefficient.

The first preferred embodiment of the present inventive method for making thin film filters having a negative temperature drift coefficient generally comprises five steps as follows: 1. providing a substrate wafer which has a coefficient of thermal expansion (CTE) greater than that of selected film stack material; 2. polishing the substrate wafer; 3. depositing a stack of films each having a CTE smaller than that of the substrate wafer onto the substrate at a temperature substantially higher than room temperature; 4. cooling the resulting substrate-film laminate to room temperature, thus forming a convex-shaped substrate-film laminate; 5. cutting the cooled substrate-film laminate into pieces.

In the first step, a substrate wafer that has a CTE ranging from $10\times10^{-6}/°$ K to $20\times10^{-6}/°$ K is provided. The substrate wafer must be transparent in the telecommunication range, i.e., C band (1528 nm to 1561 nm) and L band (1561 nm to 1620 nm). The substrate wafer can be made of glass of a $SiO_2$—$Na_2O$—$K_2O$—$Li_2O$—$PbO$—$XO_2$ system, wherein X can be titanium (Ti) or zirconium (Zr). It can also be made of a $SiO_2$—$Na_2O$—$K_2O$—$Li_2O$—$PbO$—$Q_2O_3$ system, wherein Q can be aluminum (Al), or of a $SiO_2$—$Na_2O$—$K_2O$—$Li_2O$—$P_2O_5$—$ZO_2$ system, wherein Z can be titanium (Ti) or zirconium (Zr). To increase the CTE of the glass substrate to the desired range, the substrate wafer can be doped with lead (Pb), lithium (Li), sodium (Na), potassium (K), or some other alkali ions or oxides.

In order to increase the adhesion between the film stack and the substrate wafer, in the second step, the substrate wafer is polished to a roughness in the range of from 0.1 nm to 0.8 nm.

Then, in the third step, $Ta_2O_5/SiO_2$, which has a CTE ranging from $1\times10^{-6}/°$ K to $8\times10^{-6}/°$ K, is used as a material for the thin film stack deposited on the substrate. Each film layer is made of the film stack material, and a chemical vapor deposition (CVD) method is preferred for depositing the film layers on the substrate and on each other. In this step, the substrate and film layers are substantially planar during the layering process. The process is conducted at a temperature substantially higher than room temperature.

Figure 1A:
FIG. 1*a* is a cross-sectional view of a thin film filter having a positive temperature drift coefficient of the prior art.
Figure 1B:
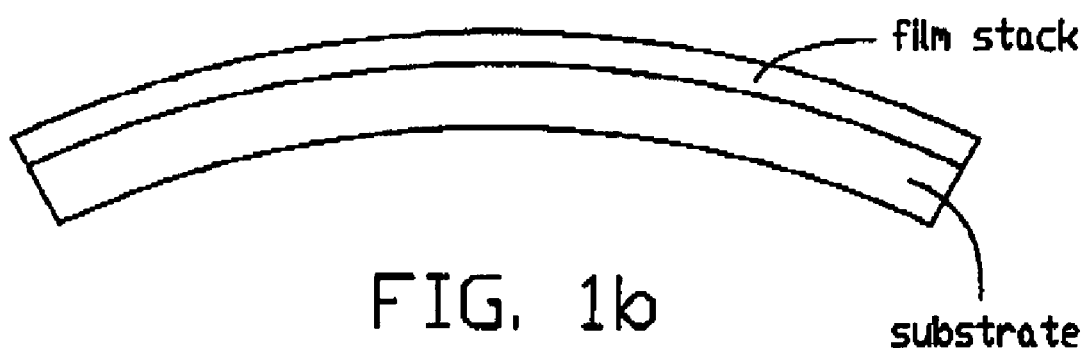
FIG. 1b is a cross-sectional view of a thin film filter having a negative temperature drift coefficient according to the invention.
Figure 2:
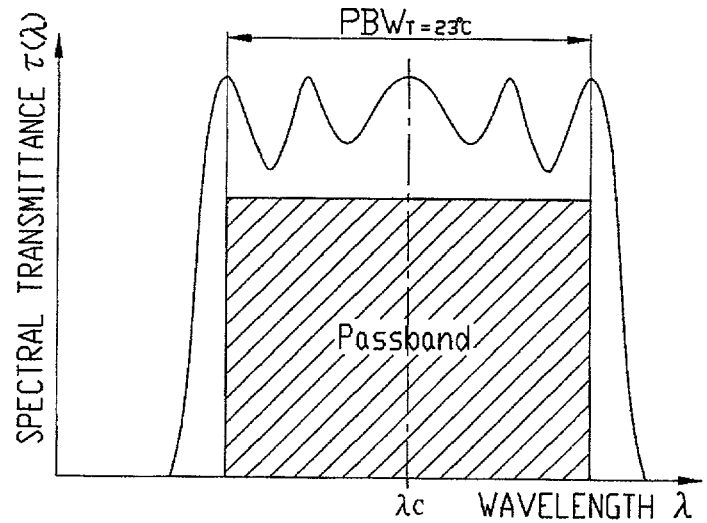
FIG. 2 is a graph of a thin film filter's spectral transmittance versus wavelength characteristics, showing a pass bandwidth of the thin film filter at room temperature (23° C.)
Figure 3:
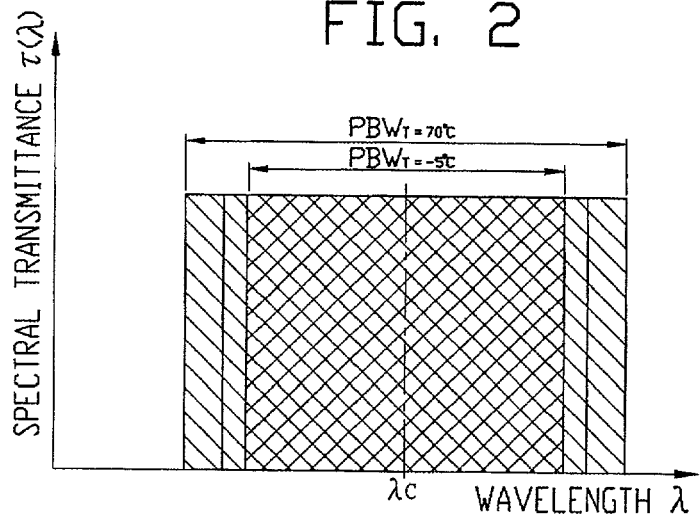
FIG. 3 is a graph of a thin film filter's spectral transmittance versus wavelength characteristics, for the case of a thin film filter having a positive temperature drift coefficient, showing the change in pass bandwidth over the operational temperature range (−5° C. to 70° C.)
Figure 4:
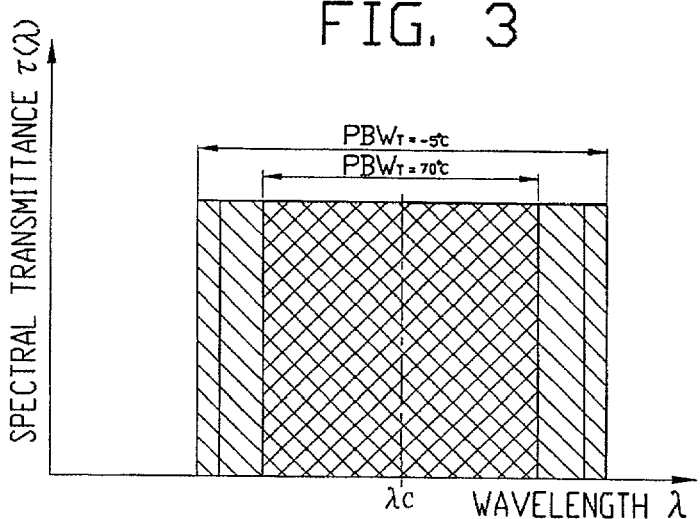
FIG. 4 is a graph of a thin film filter's spectral transmittance versus wavelength characteristics, for the case of a thin film filter having a negative temperature drift coefficient, showing the change in pass bandwidth over the operational temperature range (−5° C. to 70° C.)
Figure 5:
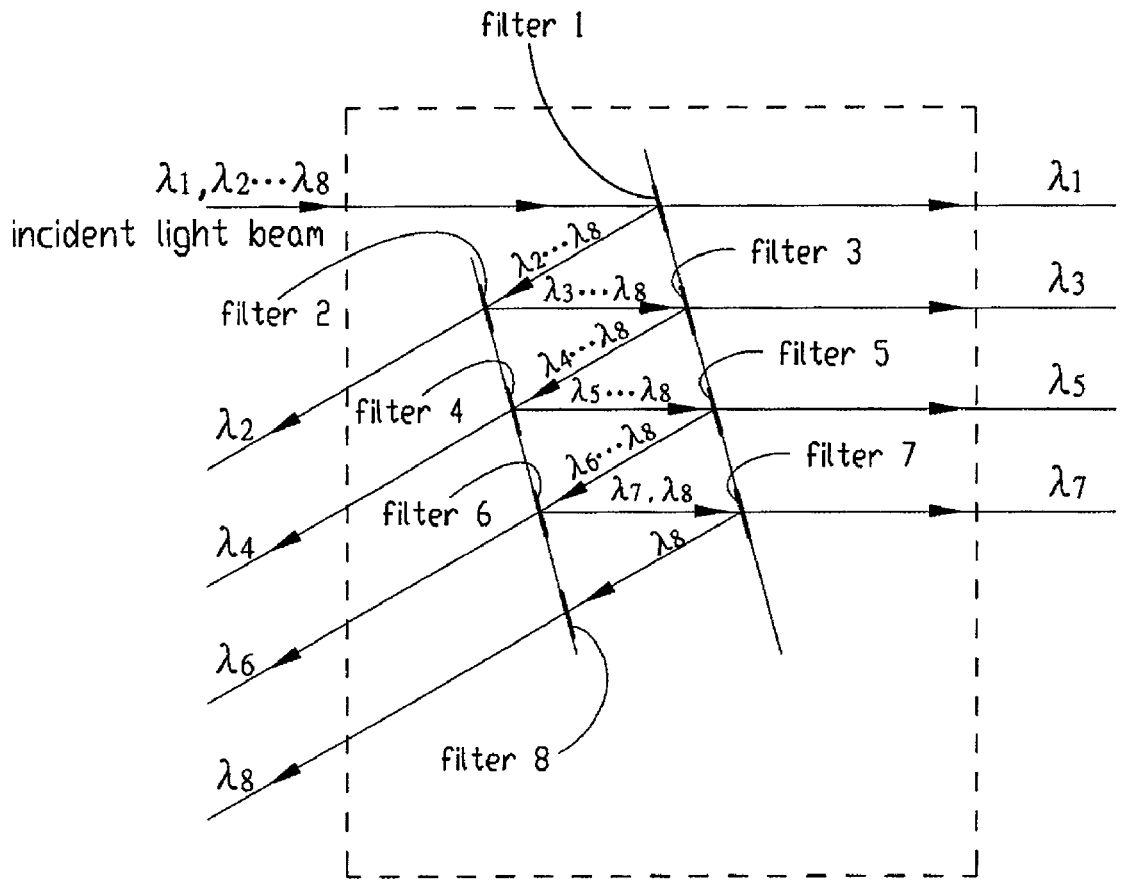
FIG. 5 is a schematic diagram showing the functioning of an eight-channel, filter-type DWDM device.

In the fourth step, the substrate and film layers laminate produced in step three is cooled down. Referring to FIG. 1b, since the CTE of the substrate wafer is greater than that of the film layers, when cooling down in the fourth step, the substrate wafer shrinks more than the film layers do. Therefore, the resulting laminated substrate and film layers will become slightly convex, and the film layers will endure a compressive stress at room temperature.

Finally, in the fifth step, the convexly shaped laminate of the substrate and film layers is cut into pieces, each having a negative temperature drift coefficient and compressive stress distribution in its film stack at room temperature.

The second preferred embodiment of the present invented method for making thin film filters having a negative temperature drift coefficient comprises three steps as follows: 1. providing a laminate comprising a glass substrate and a film stack; 2. providing at least one ion beam source for use in bombarding the film stack in the laminate; 3. cutting the bombarded laminate into pieces.

In the first step of the second embodiment, a laminate made of a glass substrate and thin film stack is put in a target position. In the second step, at least one ion source is heated to release ions. The ions are then accelerated by an electric field to bombard the film stack in the target laminate. Before reaching the target, the mean energy of the ions is between 100 and 1500 electron-volts. The ion beam source may be a Kaufman source. The bombarding ion beam causes the structure of the film stack to condense. A denser structure means closer distances between adjacent atoms in the film stack, which induces a compressive stress in the film stack. Finally, in the third step, the resultant bombarded laminate is cut into pieces to obtain the DWDM filter devices with a desired negative temperature drift coefficient.

The method described in the first preferred embodiment can be used with the second. Thin film filters made using the above described methods have a more dependable optical performance in a DWDM system when working within the operational temperature range. It is to be understood that the above-described preferred embodiments of the present invention are intended to exemplify the invention without limiting its scope. In addition, even though numerous characteristics and advantages of the present invention have been set forth in the foregoing description, together with details of the functions of the present invention, the disclosure is illustrative only. Changes may be made in detail, especially in matters of obviously similar methods, materials, processes and equipment, within the principles of the present invention to the full extent indicated by the broad general meaning of the terms in which the appended claims are expressed.

The invention claimed is:

1. A method for making a thin film filter having a negative temperature drift coefficient, comprising the steps of:
   providing a film stack material;
   providing a substrate wafer which has a coefficient of thermal expansion greater than that of the film stack material;
   polishing the substrate wafer;
   depositing thin film layers made of the film stack material on the substrate wafer at a temperature substantially higher than room temperature, thereby creating a film stack on the substrate wafer;
   cooling the substrate wafer-film stack laminate to room temperature; and
   cutting the cooled substrate wafer-film stack laminate into pieces, wherein the coefficient of thermal expansion of the substrate wafer is within the range from $10 \times 10^{-6}/°$ K to $20 \times 10^{-6}/°$ K, and the substrate is made of a $SiO_2$—$Na_2O$—$K_2O$—$Li_2O$—$PbO$—$XO_2$ system, wherein X can be titanium (Ti) or zirconium (Zr).

2. A method for making a thin film filter having a negative temperature drift coefficient, comprising the steps of:

providing a film stack material;

providing a substrate wafer which has a coefficient of thermal expansion greater than that of the film stack material;

polishing the substrate wafer;

depositing thin film layers made of the film stack material on the substrate wafer at a temperature substantially higher than room temperature, thereby creating a film stack on the substrate wafer;

cooling the substrate wafer-film stack laminate to room temperature; and cutting the cooled substrate wafer-film stack laminate into pieces, wherein the coefficient of thermal expansion of the substrate wafer is within the range from $10 \times 10^{-6}/°$ K to $20 \times 10^{-6}/°$ K, and the substrate is made of a $SiO_2$—$Na_2O$—$K_2O$—$Li_2O$—$PbO$—$Q_2O_3$ system wherein Q can be aluminum (Al).

3. A method for making a thin film filter having a negative temperature drift coefficient, comprising the steps of:

providing a film stack material;

providing a substrate wafer which has a coefficient of thermal expansion greater than that of the film stack material;

polishing the substrate wafer;

depositing thin film layers made of the film stack material on the substrate wafer at a temperature substantially higher than room temperature, thereby creating a film stack an the substrate wafer;

cooling the substrate wafer-film stack laminate to room temperature; and cutting the cooled substrate wafer-film stack laminate into pieces, wherein the coefficient of thermal expansion of the substrate wafer is within the range from $10 \times 10^{-6}/°$ K to $20 \times 10^{-6}/°$ K, and the substrate is made of a $SiO_2$—$Na_2O$—$K_2O$—$Li_2O$—$P_2O_5$—$ZO_2$ system, wherein Z can be titanium (Ti) or zirconium (Zr).

* * * * *